United States Patent
Hashimoto et al.

(10) Patent No.: US 10,479,318 B2
(45) Date of Patent: Nov. 19, 2019

(54) WEBBING PULL-IN DEVICE

(71) Applicant: KABUSHIKI KAISHA TOKAI-RIKA-DENKI-SEISAKUSHO, Aichi (JP)

(72) Inventors: Haruhiko Hashimoto, Aichi (JP); Masaru Ukita, Aichi (JP); Ryu Nakashima, Aichi (JP); Yoshihiko Ushiyama, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 46 days.

(21) Appl. No.: 15/572,537

(22) PCT Filed: May 11, 2016

(86) PCT No.: PCT/JP2016/064068
§ 371 (c)(1),
(2) Date: Nov. 8, 2017

(87) PCT Pub. No.: WO2016/185985
PCT Pub. Date: Nov. 24, 2016

(65) Prior Publication Data
US 2018/0134251 A1 May 17, 2018

(30) Foreign Application Priority Data

May 20, 2015 (JP) .................................. 2015-102508

(51) Int. Cl.
*B60R 22/46* (2006.01)

(52) U.S. Cl.
CPC .............................. *B60R 22/4628* (2013.01)

(58) Field of Classification Search
CPC .. B60R 22/46; B60R 22/4619; B60R 22/4628
See application file for complete search history.

(56) References Cited

U.S. PATENT DOCUMENTS

| 4,449,443 A | * | 5/1984 | Fohl | ..................... B60R 22/4619 60/636 |
| 5,088,794 A | * | 2/1992 | Iwami | ..................... B60R 22/20 297/475 |

(Continued)

FOREIGN PATENT DOCUMENTS

JP     2007-168589 A     7/2007

OTHER PUBLICATIONS

International Search Report and Written Opinion issued in the corresponding application PCT/JP2016/064068 dated Aug. 16, 2016.

*Primary Examiner* — Sang K Kim
(74) *Attorney, Agent, or Firm* — Roberts Mlotkowski Safran Cole & Calderon P.C.

(57) ABSTRACT

A webbing pull-in device has a take-up shaft at which a webbing can be pulled in due to the take-up shaft being operated, a first pulley that is rotated at a time of an emergency of a vehicle, and a second pulley that, by being rotated, operates the take-up shaft. Further, the webbing pull-in device has a connecting wire that connects the first pulley and the second pulley, and that, by being taken up onto the first pulley at a time when the first pulley is rotated, transmits rotational force of the first pulley to the second pulley.

5 Claims, 8 Drawing Sheets

(56) References Cited

U.S. PATENT DOCUMENTS 5,588,608 A * 12/1996 Imai .................... B60R 22/4619
                                                        242/374
6,302,346 B1 * 10/2001 Brown .................... B60R 22/28
                                                        242/371

* cited by examiner

WEBBING PULL-IN DEVICE

CROSS-REFERENCE TO RELATED APPLICATIONS

The present application is a U.S. National Phase of PCT/JP2016/064068 filed on May 11, 2016 claiming priority to Japanese Patent Application No. 2015-102508 filed May 20, 2015. The disclosure of the PCT Application is hereby incorporated by reference into the present Application.

TECHNICAL FIELD

The present invention relates to a webbing pull-in device.

BACKGROUND ART

Japanese Patent Application Laid-Open (JP-A) No. 2007-168589 discloses a webbing pull-in device that by, at the time of an emergency of a vehicle, taking-up a strap that is connected to a webbing, pulls-in the portion of the webbing that is applied to the waist portion of the vehicle occupant. This webbing pull-in device is structured to include a spool on which the strap is taken up, a torsion shaft whose one end portion is joined to the spool, a gear that is mounted to another end portion of the torsion shaft, a pinion that meshes-together with the gear, and a rack that is moved due to a gas generator being operated. Further, when the gas generator is operated at the time of an emergency of the vehicle, the rack is pushed-out and is moved rectilinearly. Due thereto, the pinion that is meshed-together with the rack is rotated and driven, and the spool is rotated in the take-up direction via the gear and the torsion shaft. As a result, the strap is taken up in a layered form onto the spool.

SUMMARY OF INVENTION

Technical Problem

By the way, from the standpoint of improving the ability to install a webbing pull-in device into a vehicle, it is desirable to be able to flexibly set the shape of the webbing pull-in device.

In view of the above-described circumstances, an object of the present invention is to provide a webbing pull-in device whose shape can be set flexibly.

Solution to Problem

A webbing pull-in device of a first aspect of the present invention includes: a pull-in body at which a webbing can be pulled in due to the pull-in body being operated; a first rotating body that is rotated at a time of an emergency of a vehicle; a second rotating body that, by being rotated, operates the pull-in body; and a connecting member that connects the first rotating body and the second rotating body, and that, by being taken up onto the first rotating body at a time when the first rotating body is rotated, transmits rotational force of the first rotating body to the second rotating body.

In a webbing pull-in device of a second aspect of the present invention, in the webbing pull-in device of the first aspect, the first rotating body has a take-up portion onto which the connecting member is taken up, and the second rotating body has a winding portion on which the connecting member is wound, and the take-up portion and the winding portion differ from one another in at least one of dimension or shape.

In a webbing pull-in device of a third aspect of the present invention, in the webbing pull-in device of a first or second aspect, a rotational axis direction of the first rotating body is oriented in a direction intersecting a rotational axis direction of the second rotating body.

In a webbing pull-in device of a fourth aspect of the present invention, in the webbing pull-in device of any one aspect of the first through the third, the second rotating body has a winding portion on which the connecting member is wound, and the connecting member is wound onto the winding portion from a rotational axis direction one side of the winding portion toward another side, and the connecting member is pulled out toward a radial direction outer side and a rotational axis direction another side of the winding portion.

In a webbing pull-in device of a fifth aspect of the present invention, in the webbing pull-in device of any one aspect of the first through the fourth, the first rotating body is structured so as to be rotated interlockingly with movement of a moving member that is moved due to gas being supplied into a cylinder, and the connecting member is disposed at an outer side of the cylinder.

Advantageous Effects of Invention

In the webbing pull-in device of the first aspect of the present invention, when the first rotating body is rotated at the time of an emergency of the vehicle, the first rotating body takes-up the connecting member. Due thereto, the rotational force of the first rotating body is transmitted to the second rotating body via the connecting member. Further, due to the second rotating body being rotated, the pull-in body is operated, and the webbing is pulled in. Here, in the present invention, there is a structure in which, due to the first rotating body being rotated and the first rotating body taking-up the connecting member, the rotational force of the first rotating body is transmitted to the second rotating body. By utilizing such a structure, it can be made to be difficult to be constrained by the rotational axis direction of the first rotating body and the rotational axis direction of the second rotating body. Due thereto, the first rotating body and the second rotating body can be disposed flexibly, and accordingly, the shape of the webbing pull-in device can be set flexibly.

In the webbing pull-in device of the second aspect of the present invention, the pull-in characteristics of the webbing by the pull-in body can be adjusted by setting at least either of the dimensions or the shapes of the take-up portion of the first rotating body and the winding portion of the second rotating body so as to differ from one another.

In the webbing pull-in device of the third aspect of the present invention, as compared with a case in which the rotational axis direction of the first rotating body and the rotational axis direction of the second rotating body are set to be parallel, an increase in the dimension in the rotational radius direction of the first rotating body and an increase in the dimension in the rotational radius direction of the second rotating body, of the mechanism that transmits rotational force from the first rotating body to the second rotating body, can be suppressed.

In the webbing pull-in device of the fourth aspect of the present invention, the connecting member is wound on the winding portion of the second rotating body from a rotational axis direction one side of the winding portion toward another side. Further, the connecting member is pulled out toward a radial direction outer side and a rotational axis direction another side of the winding portion. Due thereto, at the time when the first rotating body is rotated and the connecting member is pulled out from the winding portion of the second rotating body, the connecting members slidingly contacting one another can be suppressed.

In the webbing pull-in device of the fifth aspect of the present invention, due to the connecting member being disposed at the outer side of the cylinder, the connecting member being exposed to the gas that is supplied into the cylinder can be suppressed. Due thereto, the heat of the gas that is supplied into the cylinder being transmitted to the connecting member can be suppressed.

DESCRIPTION OF EMBODIMENTS

A webbing pull-in device relating to an embodiment of the present invention is described by using FIG. 1 through FIG. 5.

Figure 1:
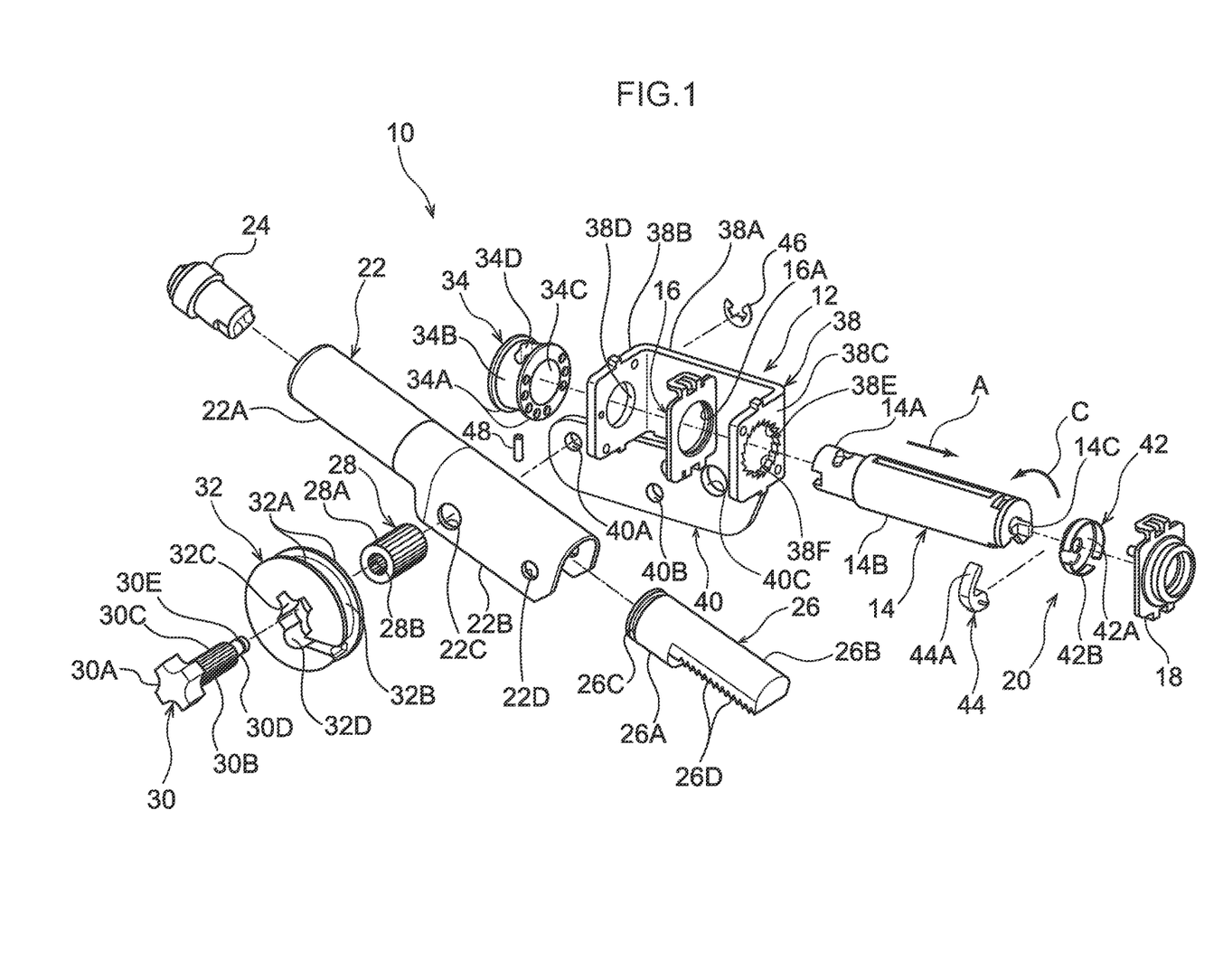
FIG. 1 is an exploded perspective view showing a webbing pull-in device in a disassembled state.
Figure 2:
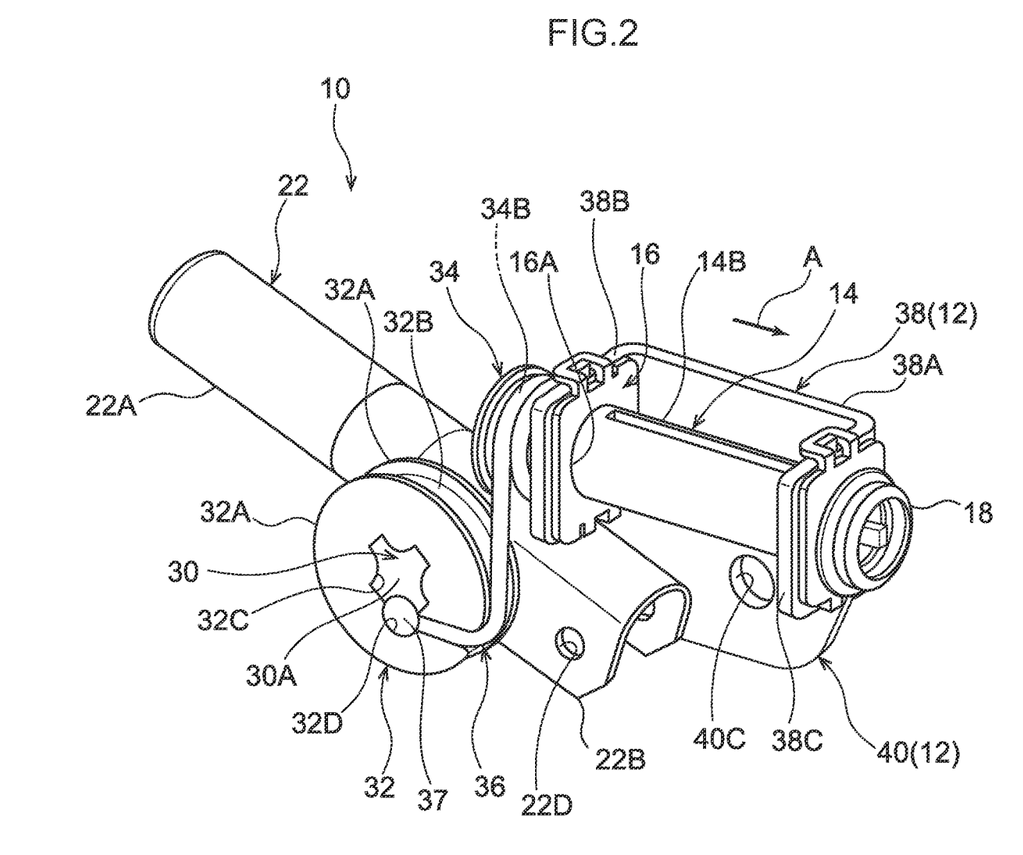
FIG. 2 is a perspective view showing the webbing pull-in device.

As shown in FIG. 1 and FIG. 2, a webbing pull-in device 10 of the present embodiment is a structure that is used in order to improve the ability to restrain the waist portion of a vehicle occupant by pulling-in the portion of a webbing which portion is applied to the waist portion of the vehicle occupant (a lap webbing) by, at the time of an emergency of a vehicle (at the time of a collision or rapid deceleration of the vehicle, or the like), taking-up a member that is connected to the webbing or a buckle, or the webbing itself. Concretely, as shown in FIG. 1, the webbing pull-in device 10 has a frame 12 that is fixed to the vehicle body or to a frame that structures a portion of a vehicle seat, a take-up shaft 14 that serves as a pull-in body and on which a member that is connected to the webbing or the buckle, or the webbing itself, is taken up, and a take-up shaft supporting member 16 and a spring case 18 that are mounted to the frame 12. Further, the webbing pull-in device 10 has a lock mechanism 20 that restricts pulling-out, from the take-up shaft 14, of a member that is connected to the webbing or the buckle, or the webbing itself, that has been taken up on the take-up shaft 14. Moreover, the webbing pull-in device 10 has a cylinder 22, a gas generating device 24 that supplies gas into the cylinder 22, and a rack 26 that serves as a moving member that is moved by the pressure of the gas that is supplied into the cylinder 22. Further, the webbing pull-in device 10 has a pinion gear 28 that is rotated by the rack 26, a pinion shaft 30 that is provided so as to be able to rotate integrally with the pinion gear 28, and a first pulley 32 that serves as a first rotating body, a second pulley 34 that serves as a second rotating body and a connecting wire 36 (see FIG. 2) that serves as a connecting member, which transmit rotational force of the pinion shaft 30 to the take-up shaft 14.

The frame 12 is formed by press working or the like being carried out on a steel plate material. This frame 12 has a shaft placement portion 38 that is formed in a substantial U-shape, and an extending portion 40 that extends from the shaft placement portion 38. The shaft placement portion 38 has a back plate 38A that is rectangular, and a pair of side walls 38B, 38C that extend so as to be bent toward one side in the thickness direction of the back plate 38A from the length direction both end portions of the back plate 38A. A take-up shaft insert-through hole 38D, through which an axial direction one side end portion of the take-up shaft 14 is inserted, is formed in the side wall 38B that is at one side. A lock mechanism placement hole 38E, at whose radial direction inner side the lock mechanism 20 that is described later is disposed, is formed in the side wall 38C that is at another side. Further, plural lock plate engaging teeth 38F, with which a lock plate 44 of the lock mechanism 20 engages, are formed at the inner peripheral edge portion of the lock mechanism placement hole 38E along the peripheral direction thereof. Further, the extending portion 40 is disposed in the same plane as the back plate 38A. A pinion shaft insert-through hole 40A through which the pinion shaft 30 that is described later is inserted, and a cylinder fixing pin insert-through hole 40B through which an unillustrated cylinder fixing pin is inserted, are formed in the extending portion 40. Moreover, a bolt insert-through hole 40C, through which is inserted a bolt 41 (see FIG. 3) for fixing the frame 12 to the vehicle body or to the frame that structures a portion of the vehicle seat, is formed in the extending portion 40.

The take-up shaft 14 is made by aluminum die casting as an example, and this take-up shaft 14 is formed substantially in the shape of a solid cylinder. Further, the end portion at the axial direction one side of the take-up shaft 14 is made to be a second pulley engaging portion 14A with which a second pulley 34 that is described later is engaged. Further, the region of the take-up shaft 14, which portion is further toward the axial direction another side than the second pulley engaging portion 14A, is made to be a take-up portion 14B on which an unillustrated member that is connected to the webbing or the buckle, or the webbing itself, is taken up, and that is set to be a larger diameter than the second pulley engaging portion 14A. Further, a spooling guide fixing portion 14C, to which is fixed a spooling guide 42 that structures a portion of the lock mechanism 20 that is described later, is provided at the axial direction another side end portion of the take-up shaft 14. Further, the axial direction another side region of the take-up shaft 14 is rotatably supported at the frame 12 due to the spooling guide fixing portion 14C being rotatably supported via the spooling guide 42 at the lock mechanism placement hole 38E that is formed in the frame 12.

The take-up shaft supporting member 16 is fixed to the side wall 38B of the frame 12 in a state of being disposed along the side wall 38C side surface of the side wall 38B. This take-up shaft supporting member 16 is formed in the shape of a rectangular plate that corresponds to the shape of the side wall 38B of the frame 12. Further, a supporting hole 16A, which is circular and that is set to have an inner diameter that corresponds to the outer diameter of the axial direction one side end portion of the take-up portion 14B of the take-up shaft 14, is formed in the take-up shaft supporting member 16. Further, the axial direction one side region of the take-up shaft 14 is rotatably supported at the frame 12 via the take-up shaft supporting member 16, due to the axial direction one side end portion of the take-up portion 14B of the take-up shaft 14 being rotatably supported at the supporting hole 16A.

The spring case 18 is fixed to the side wall 38C of the frame 12 in a state of being disposed along the surface of the side wall 38C which surface is at the side opposite the side wall 38B. Further, due to this spring case 18 being fixed to the side wall 38C of the frame 12, movement of the spooling guide 42, which is fixed to the take-up shaft 14, toward the axial direction another side is restricted.

The lock mechanism 20 is structured to include the spooling guide 42 that is fixed to the spooling guide fixing portion 14C of the take-up shaft 14, and the lock plate 44 that is supported at the spooling guide 42. Further, the spooling guide 42 has a circular plate portion 42A that is formed in the shape of a circular plate, and a cylindrical portion 42B that bends and extends from the radial direction outer side end of the circular plate portion 42A toward the spring case 18 side and that is formed in the shape of a tube at which a portion thereof is cut-out. The lock plate 44 is formed in the shape of a block that has an engaging claw portion 44A that engages with the lock plate engaging teeth 38F that are provided at the frame 12. Further, at the time when the take-up shaft 14 is rotated in a take-up direction (the arrow C direction), the entire lock plate 44 is disposed at the radial direction inner side of the cylindrical portion 42B of the spooling guide 42. In contrast, when the take-up shaft 14 is rotated in a pull-out direction (the direction opposite arrow C), the engaging claw portion 44A of the lock plate 44 projects-out from the cut-out portion of the cylindrical portion 42B of the spooling guide 42 toward the radial direction outer side of this cylindrical portion 42B. As a result, the engaging claw portion 44A of the lock plate 44 engages with the lock plate engaging teeth 38F that are provided at the frame 12, and rotation of the take-up shaft 14 in the pull-out direction is limited.

The cylinder 22 has a cylinder main body portion 22A that is formed in a tubular shape, and a rack-and-pinion gear placement portion 22B that is formed integrally with the cylinder main body portion 22A and is disposed in a state in which the rack 26 and the pinion gear 28 are meshed with the interior thereof. The gas generating device 24 that generates gas by being operated is mounted to an end portion at one side of the cylinder main body portion 22A. Due to the gas that this gas generating device 24 generates being supplied into the cylinder main body portion 22A, the pressure of the cylinder main body portion 22A interior rises. Further, the rack-and-pinion gear placement portion 22B is formed in a U-shaped cross-section that extends in the axial direction of the cylinder main body portion 22A. A pinion shaft insert-through hole 22C through which the pinion shaft 30 is inserted, and a cylinder fixing pin insert-through hole 22D through which an unillustrated cylinder fixing pin is inserted, are formed in the rack-and-pinion gear placement portion 22B. Further, the cylinder 22 is fixed to the frame 12 due to the pinion shaft 30 being inserted through the pinion shaft insert-through hole 22C formed in the rack-and-pinion gear placement portion 22B and through the pinion shaft insert-through hole 40A formed in the frame 12, and the unillustrated cylinder fixing pin being inserted through the cylinder fixing pin insert-through hole 22D formed in the rack-and-pinion gear placement portion 22B and through the cylinder fixing pin insert-through hole 40B formed in the frame 12, and the like.

The rack 26 has a piston portion 26A, which is shaped as a solid cylinder and is set to an outer diameter that corresponds to the inner diameter of the cylinder main body portion 22A of the cylinder 22, and a rack main body portion 26B that extends from the piston portion 26A in the axial direction of the piston portion 26A. A seal mounting groove 26C, to which is mounted an unillustrated seal that closes between the outer peripheral surface of the piston portion 26A and the inner peripheral surface of the cylinder main body portion 22A, is formed in the piston portion 26A. Further, plural tooth portions 26D are formed in the rack main body portion 26B along the length direction of the rack main body portion 26B (along the axial direction of the piston portion 26A).

The pinion gear 28 is formed in a cylindrical shape. Plural tooth portions 28A that mesh-together with the tooth portions 26D of the rack 26 are formed at the outer peripheral portion of the pinion gear 28 along the peripheral direction thereof. Further, serrations 28B are formed at the inner peripheral portion of the pinion gear 28.

The pinion shaft 30 is formed in the shape of a rod that extends toward a direction that is substantially orthogonal to the axial direction of the take-up shaft 14. A first pulley engaging portion 30A, which is formed in a substantial cross shape as seen from the axial direction of the pinion shaft 30 and which is engaged with the first pulley 32 that is described later, is formed at one end portion of the pinion shaft 30. Further, the intermediate portion in the length direction of the pinion shaft 30 is made to be a pinion gear engaging portion 30C that is formed in a solid cylindrical shape and at whose outer peripheral portion serrations 30B are formed. Further, the pinion gear 28 and the pinion shaft 30 are joined so as to be able to rotate integrally due to the serrations 28B of the pinion gear 28 engaging with the serrations 30B of the pinion gear engaging portion 30C. Further, the end portion of the pinion shaft 30, which end portion is at the side opposite the side at which the first pulley engaging portion 30A is formed, is made to be an insert-through portion 30D that is formed in the shape of a solid cylinder whose diameter is smaller than that of the pinion gear engaging portion 30C and that is inserted-through the pinion shaft insert-through hole 40A that is formed in the extending portion 40 of the frame 12. Moreover, an E-ring engaging groove 30E, with which is engaged an E-ring 46 that is for suppressing pulling-out of the insert-through portion 30D from the pinion shaft insert-through hole 40A, is formed in the insert-through portion 30D.

As shown in FIG. 1, the first pulley 32 is formed in a circular plate shape that is disposed coaxially with the pinion shaft 30. As shown in FIG. 2, the first pulley 32 is disposed at the side of the rack-and-pinion gear placement portion 22B of the cylinder 22. As shown in FIG. 1, a pair of flange portions 32A, which project-out toward the radial direction outer side of the first pulley 32 and are disposed with an interval therebetween in the axial direction of the first pulley 32, are formed at the outer peripheral portion of the first pulley 32. Further, the region that is between the pair of flange portions 32A at the outer peripheral portion of the first pulley 32 is made to be a take-up portion 32B on which the connecting wire 36 that is described later is taken up. Further, an engaging concave portion 32C, with which the first pulley engaging portion 30A of the pinion shaft 30 is engaged, is formed at the axially central portion of the first pulley 32. Further, the pinion shaft 30 and the first pulley 32 are joined so as to be able to rotate integrally due to the first pulley engaging portion 30A of the pinion shaft 30 being engaged with the engaging concave portion 32C. Further, as shown in FIG. 2, an anchoring concave portion 32D, on which is anchored a caulking member 37 that is fixed to one end portion of the connecting wire 36, is formed at the end portion, which is at the side away from the extending portion 40 of the frame 12, of the axially central portion of the first pulley 32.

As shown in FIG. 1, the second pulley 34 is formed in the shape of a circular plate that is disposed coaxially with the take-up shaft 14. Further, a pair of flange portions 34A that are of a structure similar to the first pulley 32 are formed at the outer peripheral portion of the second pulley 34. Further, the region between the pair of flange portions 34A at the outer peripheral portion of the second pulley 34 is made to be a winding portion 34B on which the connecting wire 36 that is described later is wound. Further, in the present embodiment, the outer diameter of the winding portion 34B of the second pulley 34 is set to be a small diameter as compared with the outer diameter of the take-up portion 32B of the first pulley 32. Further, an engaging hole 34C, with which the second pulley engaging portion 14A of the take-up shaft 14 is engaged, is formed in the axially central portion of the second pulley 34. Further, the take-up shaft 14 and the second pulley 34 are joined so as to be able to rotate integrally due to the second pulley engaging portion 14A of the take-up shaft 14 engaging with the engaging hole 34C, and a pin 48 being inserted into unillustrated pin insertion holes that are formed in the second pulley 34 and the second pulley engaging portion 14A of the take-up shaft 14. Further, an anchor hole 34D, to which another end side of the connecting wire 36 is anchored, is formed in the winding portion 34B of the second pulley 34. Further, the second pulley 34 is rotated together with the take-up shaft 14 (the take-up shaft 14 is operated) due to the rotational force of the first pulley 32 being transmitted to the second pulley 34 via the connecting wire 36, and the second pulley 34 being rotated.

Figure 3:
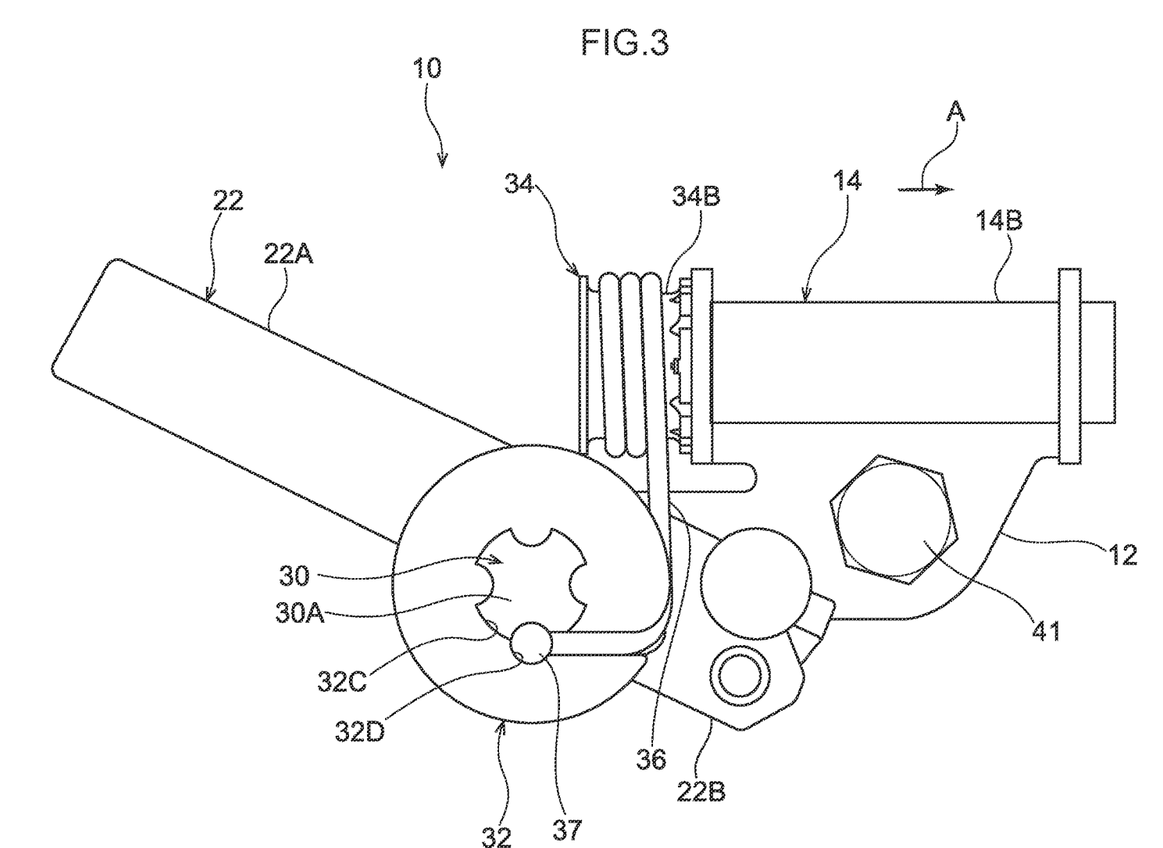
FIG. 3 is a side view showing the webbing pull-in device.
Figure 4:
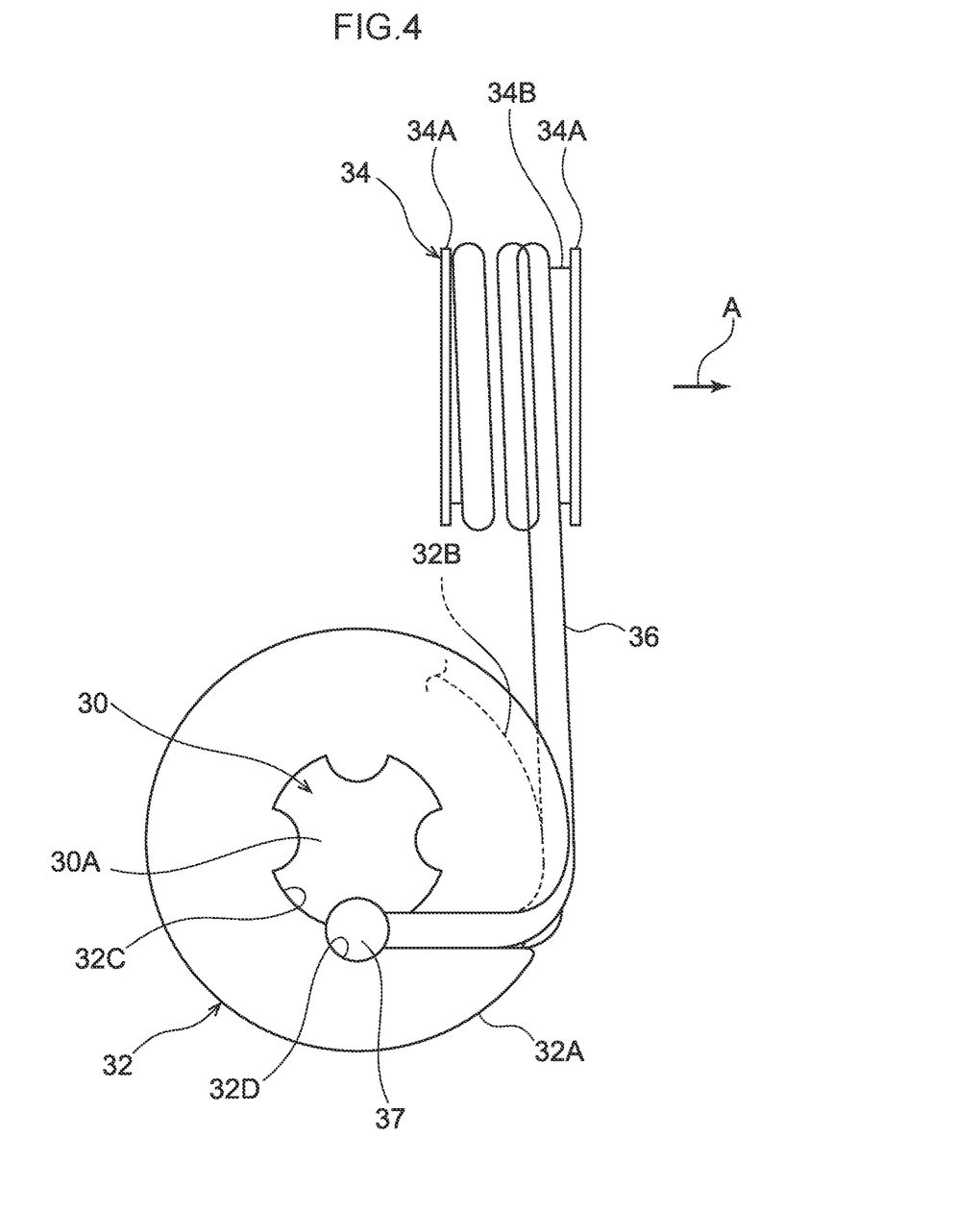
FIG. 4 is a side view showing a first pulley, a second pulley and a connecting wire.
Figure 5:
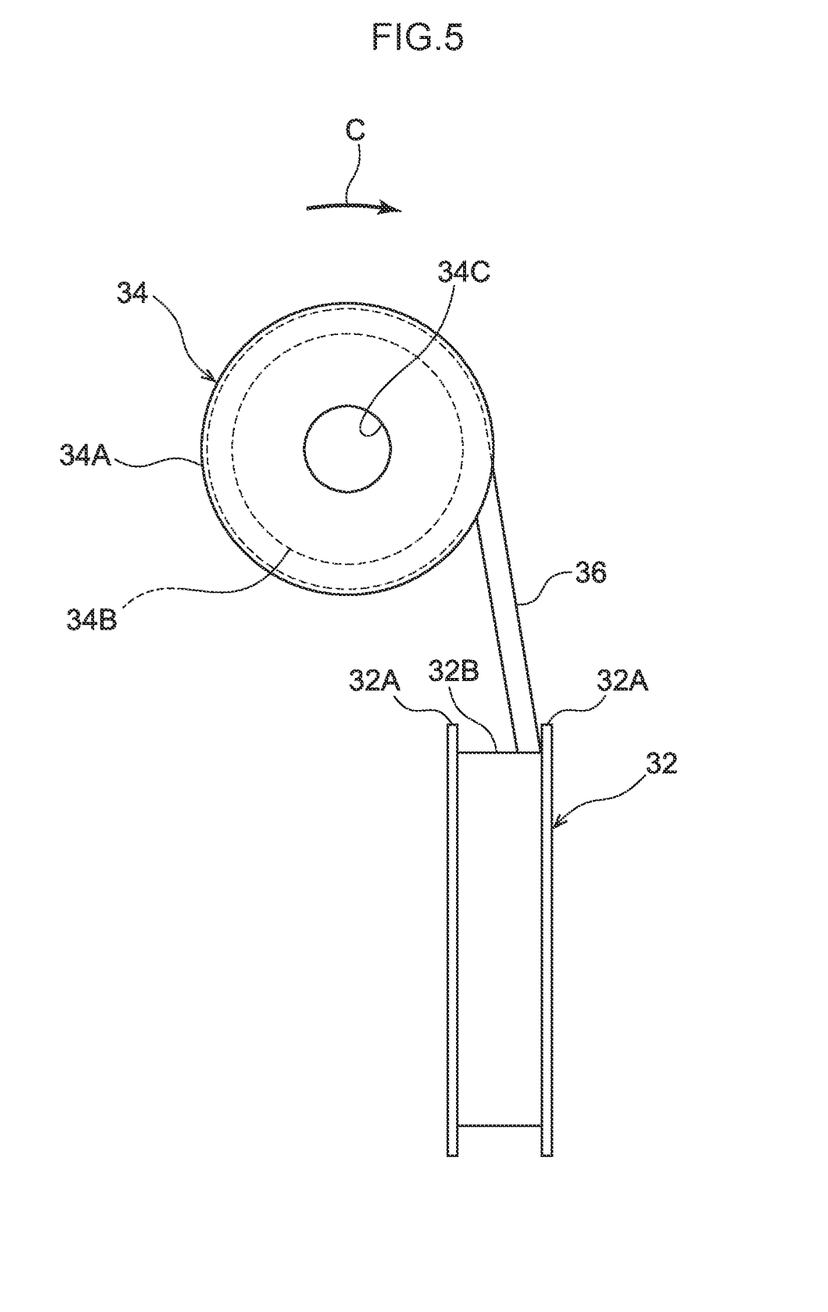
FIG. 5 is a rear view showing the first pulley, the second pulley and the connecting wire.

As shown in FIG. 2, the connecting wire 36 is a wire rope that is made of metal, such as a stainless rope or the like, and that is adjusted to a predetermined length. The caulking member 37 is fixed to one end portion of the connecting wire 36. Further, a caulking member, which is similar to the caulking member 37 that is fixed to the one end portion of the connecting wire 36, is fixed to another end portion of the connecting wire 36. Note that, in the present embodiment, the unillustrated caulking member that is fixed to the another end portion of the connecting wire 36 is anchored on the axially central portion of the second pulley engaging portion 14A of the take-up shaft 14. As shown in FIG. 3 and FIG. 4, one portion of the above-described connecting wire 36 is wound on the winding portion 34B of the second pulley 34 in a spiral form toward the axial direction of the winding portion 34B. Further, the other portion of the connecting wire 36 is led-out toward the first pulley 32 side from the take-up shaft 14 take-up portion 14B side end portion (the arrow A direction side end portion) of the winding portion 34B of the second pulley 34. Further, when the first pulley 32 is rotated, the connecting wire 36 is pulled out from the winding portion 34B of the second pulley 34 and is taken up onto the take-up portion 32B of the first pulley 32. Due thereto, the rotational force of the first pulley 32 is transmitted to the second pulley 34. Further, in the present embodiment, as shown in FIG. 4, the connecting wire 36 is pulled out in a state of being inclined slightly toward the radial direction outer side of the winding portion 34B of the second pulley 34 and the rotational axis direction another side of the second pulley 34 (the arrow A direction side). As shown in FIG. 5, the connecting wire 36 is pulled out in a state of being inclined toward the radial direction outer side of the winding portion 34B of the second pulley 34 and the flange portion 32A side, which is at the side away from the second pulley 34, at the first pulley 32.

(Operation and Effects of Present Embodiment)

The operation and effects of the present embodiment are described next.

In the webbing pull-in device 10 of the present embodiment that is illustrated in FIG. 1 through FIG. 3, at the time of an emergency of the vehicle, when the gas generating device 24 is operated and the gas that the gas generating device 24 generates is supplied into the cylinder main body portion 22A, the pressure of the cylinder main body portion 22A interior rise. Due thereto, the rack 26 is moved along the axial direction of the piston portion 26A. Further, when the rack 26 is moved along the axial direction of the piston portion 26A, the pinion gear 28 that meshes-together with the rack 26 is rotated, and the pinion shaft 30 and the first pulley 32 are rotated.

When the first pulley 32 is rotated, the connecting wire 36 is pulled out from the winding portion 34B of the second pulley 34, and is taken up onto the take-up portion 32B of the first pulley 32. Due thereto, the rotational force of the first pulley 32 is transmitted to the second pulley 34, and the second pulley 34 is rotated in the take-up direction together with the take-up shaft 14. Further, the unillustrated member that is connected to the webbing or the buckle, or the webbing itself, is taken up onto the take-up portion 14B of the take-up shaft 14.

Here, in the present embodiment, there is a structure in which, due to the first pulley 32 being rotated and the first pulley 32 taking-up the connecting wire 36, the rotational force of the first pulley 32 is transmitted to the second pulley 34. By utilizing such a structure, it is difficult to be constrained by the rotational axis direction of the first pulley 32 and the rotational axis direction of the second pulley 34. Due thereto, the first pulley 32 and the second pulley 34 can be disposed flexibly, and accordingly, the shape of the webbing pull-in device 10 can be set flexibly.

Further, in the present embodiment, due to the outer diameter of the winding portion 34B of the second pulley 34 being set to be a small diameter as compared with the outer diameter of the take-up portion 32B of the first pulley 32, the number of rotations of the take-up shaft 14 is high as compared with the number of rotations of the pinion gear 28 and the pinion shaft 30. By adjusting the outer diameter of the winding portion 34B of the second pulley 34 and the outer diameter of the take-up portion 32B of the first pulley 32 in this way, the pull-in characteristics (the pull-in speed and the pull-in force) of the webbing (the lap webbing) by the take-up shaft 14 can be adjusted.

Moreover, in the present embodiment, the rotational axis direction of the first pulley 32 (the rotational axis direction of the pinion shaft 30) and the rotational axis direction of the second pulley 34 (the rotational axis direction of the take-up shaft 14) are set to be orthogonal. Due thereto, as compared with a case in which the rotational axis direction of the first pulley 32 and the rotational axis direction of the second pulley 34 are set to be parallel, an increase in the dimension in the rotational radius direction of the first pulley 32 and an increase in the dimension in the rotational radius direction of the second pulley 34, of the mechanism that transmits rotational force from the first pulley 32 to the second pulley 34, can be suppressed.

Further, in the present embodiment, as shown in FIG. 4, the connecting wire 36 is structured so as to be pulled out in a state of being inclined slightly toward the radial direction outer side of the winding portion 34B of the second pulley 34 and the rotational axis direction another side of the second pulley 34 (the arrow A direction side). Due thereto, at the time when the first pulley 32 is rotated and the connecting wire 36 is pulled out from the winding portion 34B of the second pulley 34, the connecting wires 36 slidingly contacting one another can be suppressed. Further, in the present embodiment, as shown in FIG. 5, the connecting wire 36 is structured so as to be pulled out in a state of being inclined toward the radial direction outer side of the winding portion 34B of the second pulley 34 and the flange portion 32A side that is at the side away from the second pulley 34 at the first pulley 32. Due thereto, the connecting wire 36 being taken up onto the take-up portion 32B of the first pulley 32 in a state of being layered on itself in the radial direction of the first pulley 32 can be suppressed.

Moreover, in the present embodiment, there is a structure in which the kinetic energy of the rack 26, which is moved by the pressure of the gas that the gas generating device 24 generates, is transmitted to the take-up shaft 14 via the first pulley 32, the connecting wire 36 and the second pulley 34 that are disposed at the outer side of the cylinder 22. Due thereto, the members (the first pulley 32, the connecting wire 36, and the second pulley 34 and the like) that transmit the kinetic energy of the rack 26 being exposed to the gas that is supplied into the cylinder 22 (the cylinder main body portion 22A) can be suppressed. Namely, the heat of the gas that is supplied into the cylinder 22 being transmitted to the first pulley 32, the connecting wire 36 and the second pulley 34 and the like can be suppressed.

Note that the present embodiment describes an example in which the rotational axis direction of the first pulley 32 (the rotational axis direction of the pinion shaft 30) and the rotational axis direction of the second pulley 34 (the rotational axis direction of the take-up shaft 14) are orthogonal. However, the present invention is not limited to this. The angle that is formed by the rotational axis direction of the first pulley 32 and the rotational axis direction of the second pulley 34 may be set appropriately in consideration of the structure of the portion to which the webbing pull-in device 10 is fixed, and the like.

Further, the present embodiment describes an example in which the pull-in characteristics of the webbing (the lap webbing) by the take-up shaft 14 are adjusted by setting the outer diameter of the winding portion 34B of the second pulley 34 to a small diameter as compared with the outer diameter of the take-up portion 32B of the first pulley 32. However, the present invention is not limited to this. For example, the pull-in characteristics of the webbing (the lap webbing) by the take-up shaft 14 may be adjusted by making the shapes of the take-up portion 32B of the first pulley 32 and the winding portion 34B of the second pulley 34 differ from one another (e.g., varying the radius in accordance with the peripheral direction position). As an example, either of the take-up portion 32B of the first pulley 32 and the winding portion 34B of the second pulley 34 may be formed in an oval shape. In this structure, the pull-in speed at the initial stage of operation of the webbing pull-in device 10 can be adjusted so as to be fast as compared with the pull-in speed at the latter stage of operation, or the pull-in speed at the initial stage of operation of the webbing pull-in device 10 can be adjusted so as to be slow as compared with the pull-in speed at the latter stage of operation. Namely, the pull-in force (the torque of the take-up shaft 14) at the initial stage of operation of the webbing pull-in device 10 can be adjusted so as to be small as compared with the pull-in force at the latter stage of operation, or the pull-in force of the initial stage of operation of the webbing pull-in device 10 can be adjusted so as to be large as compared with the pull-in force at the latter stage of operation.

(First Pulleys Relating to Modified Examples)

First pulleys that relate to a first modified example and a second modified example are described next by using FIG. 6A, FIG. 6B and FIG. 7. Note that portions having the same functions as the first pulley 32 of the above-described embodiment are denoted by the same reference numerals as in the above-described embodiment, and description of these portions is omitted.

Figure 6A:
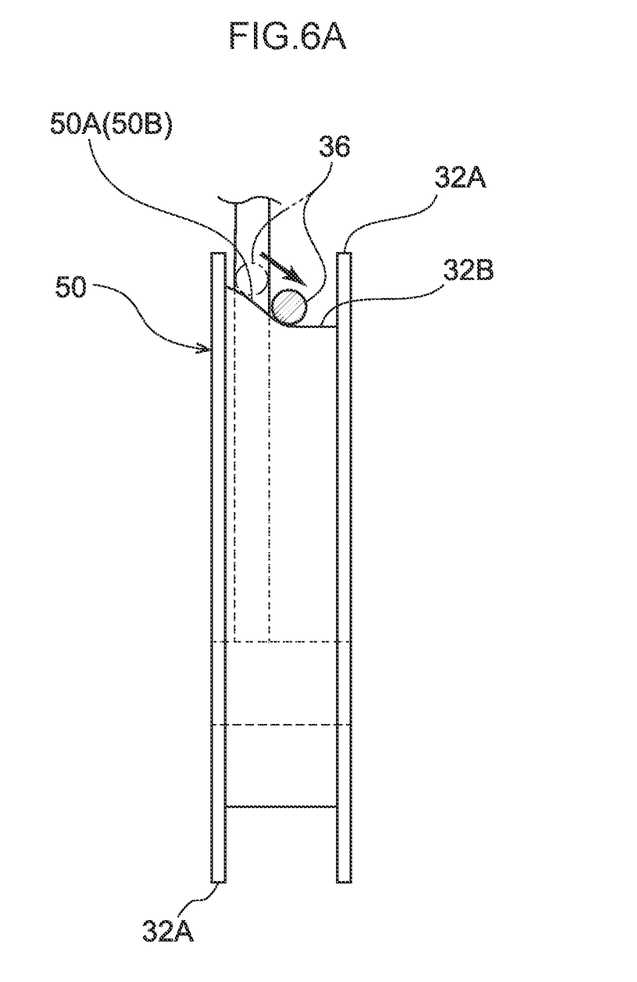
FIG. 6A is a front view showing a first pulley relating to a first modified example.
Figure 6B:
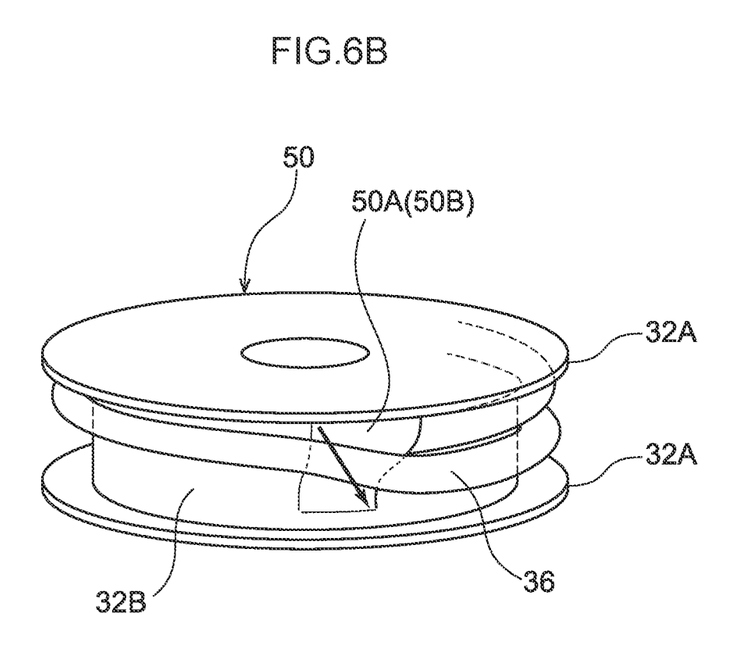
FIG. 6B is a perspective view showing the first pulley relating to the first modified example.

As shown in FIG. 6A and FIG. 6B, a first pulley 50 relating to a first modified example has the feature that an inclined projecting portion 50A is provided at a portion of the take-up portion 32B. Concretely, a surface 50B, which is at the radial direction outer side of the first pulley 50, at the inclined projecting portion 50A is inclined toward the radial direction inner side of the first pulley 50 while heading from an axial direction one side of the first pulley 50 toward another side. Further, when the first pulley 50 is rotated and the connecting wire 36 starts to be taken up onto the take-up portion 32B of the first pulley 50, the connecting wire 36 moves along the surface 50B of the inclined projecting portion 50A toward the flange portion 32A side that is at the axial direction another side of the first pulley 50. Due thereto, the connecting wire 36 being taken up onto the take-up portion 32B of the first pulley 50 while being layered on itself in the radial direction of the first pulley 50 can be suppressed.

Figure 7:
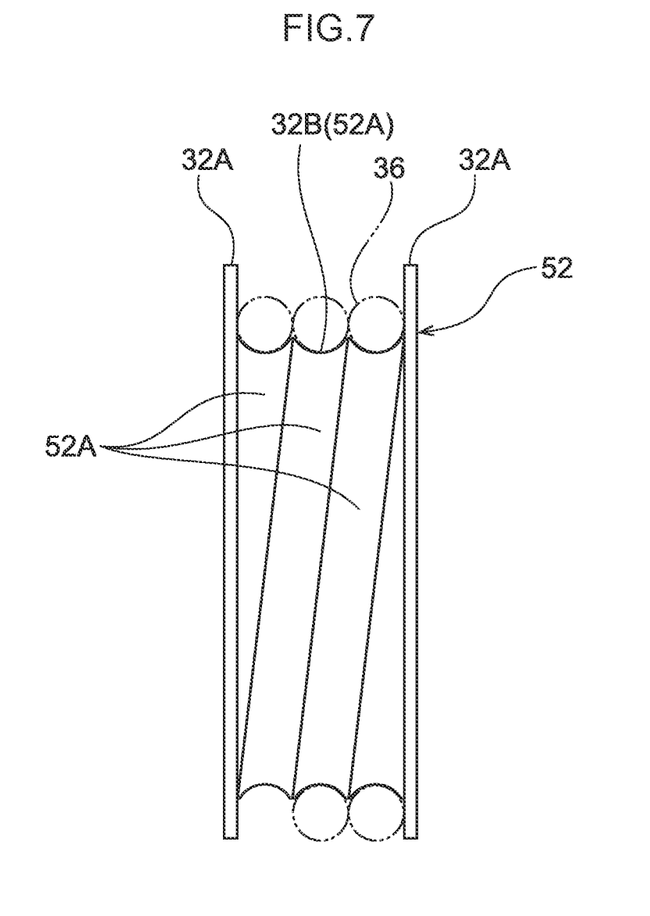
FIG. 7 is a front view showing a first pulley relating to a second modified example.

As shown in FIG. 7, a first pulley 52 relating to a second modified example has the feature that a guide groove 52A, in which the connecting wire 36 is disposed along the peripheral direction thereof, is formed in the outer peripheral surface of the take-up portion 32B. Concretely, the guide groove 52A is formed in a U-shape that is curved at a radius of curvature that corresponds to the shape of the outer peripheral surface of the connecting wire 36 as seen from the radial direction outer side of the first pulley 52. This guide groove 52A is formed in the outer peripheral surface of the take-up portion 32B in a spiral form from an axial direction one side of the first pulley 52 toward another side. Further, when the first pulley 52 is rotated, the connecting wire 36 is taken up onto the take-up portion 32B along the guide groove 52A that is formed in the take-up portion 32B of the first pulley 52. Due thereto, the connecting wire 36 being taken up onto the take-up portion 32B of the first pulley 52 so as to be layered on itself in the radial direction of the first pulley 52 can be suppressed.

Although an embodiment of the present invention has been described above, the present invention is not limited to the above, and can of course be implemented by being modified in various ways other than the above within a scope that does not depart from the gist thereof.

The disclosure of Japanese Patent Application No. 2015-102508 that was filed on May 20, 2015 is, in its entirety, incorporated by reference into the present specification.

The invention claimed is:

1. A webbing pull-in device comprising:
a pull-in body at which a webbing can be pulled in due to the pull-in body being operated;
a first rotating body that is rotated at a time of an emergency of a vehicle; a second rotating body that, by being rotated, operates the pull-in body; and
a connecting member that connects the first rotating body and the second rotating body, and that, by being taken up onto the first rotating body at a time when the first rotating body is rotated, transmits rotational force of the first rotating body to the second rotating body, wherein the connecting member is fixed to the first rotating body so as to be wound around the first rotating body at the emergency time of the vehicle, the second rotating body is directly connected to the pull-in body, and the first and second rotating bodies are configured to remain stationary with respect to each other during the emergency time of the vehicle.

2. The webbing pull-in device of claim 1, wherein the first rotating body includes a take-up portion onto which the connecting member is taken up, and the second rotating body includes a winding portion on which the connecting member is wound, and the take-up portion and the winding portion differ from one another in at least one of dimension or shape.

3. The webbing pull-in device of claim 1, wherein a rotational axis direction of the first rotating body is oriented in a direction intersecting a rotational axis direction of the second rotating body.

4. The webbing pull-in device of claim 1, wherein the second rotating body includes a winding portion on which the connecting member is wound, and the connecting member is wound onto the winding portion from a rotational axis direction one side of the winding portion toward another side, and the connecting member is pulled out toward a radial direction outer side and a rotational axis direction other side of the winding portion.

5. The webbing pull-in device of claim 1, wherein the first rotating body is structured so as to be rotated interlockingly with movement of a moving member that is moved due to gas being supplied into a cylinder, and the connecting member is disposed at an outer side of the cylinder.

* * * * *